United States Patent
Liu et al.

(10) Patent No.: US 11,281,586 B2
(45) Date of Patent: Mar. 22, 2022

(54) PROCESSOR AND WAY PREDICTION METHOD THEREOF

(71) Applicant: ANDES TECHNOLOGY CORPORATION, Hsin-Chu (TW)

(72) Inventors: Kun-Ho Liu, New Taipei (TW); Chieh-Jen Cheng, Kaohsiung (TW); Chuan-Hua Chang, Taipei (TW); I-Cheng Kevin Chen, Taipei (TW)

(73) Assignee: ANDES TECHNOLOGY CORPORATION, Hsin-Chu (TW)

( * ) Notice: Subject to any disclaimer, the term of this patent is extended or adjusted under 35 U.S.C. 154(b) by 1049 days.

(21) Appl. No.: 15/591,074

(22) Filed: May 9, 2017

(65) Prior Publication Data

US 2018/0330259 A1 Nov. 15, 2018

(51) Int. Cl.
*G06F 12/0862* (2016.01)
*G06F 12/0875* (2016.01)
(Continued)

(52) U.S. Cl.
CPC ........ *G06F 12/0862* (2013.01); *G06F 9/3806* (2013.01); *G06F 12/0875* (2013.01);
(Continued)

(58) Field of Classification Search
CPC ............. G06F 12/0862; G06F 12/0875; G06F 9/3806; G06F 2212/1028; G06F 12/0864;
(Continued)

(56) References Cited

U.S. PATENT DOCUMENTS 6,425,055 B1  7/2002  Sager et al.
6,438,673 B1  8/2002  Jourdan et al.
(Continued)

FOREIGN PATENT DOCUMENTS

| CN | 106126451 | 11/2016 |
|----|-----------|---------|
| JP | 2000099399 | 4/2000 |
| JP | 2005316842 | 11/2005 |
| JP | 2011257800 | 12/2011 |

(Continued)

OTHER PUBLICATIONS

Kim et al., Path Confidence based Lookahead Prefetching, [online], Date Added to IEEE Xplore: Dec. 15, 2016 [retrieved on Jul. 30, 2020], Retrieved from the Internet:< URL: https://ieeexplore.IEEE.org/document/7783763> (Year: 2016).*

(Continued)

*Primary Examiner* — David Yi
*Assistant Examiner* — Dustin B. Fulford
(74) *Attorney, Agent, or Firm* — JCIPRNET (57) ABSTRACT

The invention provides a processor including a prediction table, a prediction logic circuit, and a prediction verification circuit. The prediction table has a plurality of sets respectively corresponding to a plurality of cache sets of a cache memory in the cache system, each of the sets has a plurality of confidence values, and the prediction table provides the confidence values of a selected set according to the index. The prediction logic circuit receives the confidence values of the selected set, and generates a prediction result by judging whether each of the confidence values of the selected set is larger than a threshold value or not. The prediction verification circuit receives the prediction result, generates a correct/incorrect information according to the prediction result, and generates an update information according to the correct/incorrect information. Wherein, the prediction verification circuit updates the confidence values of the prediction table according to the update information.

9 Claims, 12 Drawing Sheets

(51) Int. Cl.
*G06F 12/0864* (2016.01)
*G06F 9/38* (2018.01)
*G06F 12/122* (2016.01)
*G06N 20/00* (2019.01)

(52) U.S. Cl.
CPC ........ *G06F 12/122* (2013.01); *G06F 12/0864* (2013.01); *G06F 2212/1024* (2013.01); *G06F 2212/1028* (2013.01); *G06F 2212/452* (2013.01); *G06F 2212/6082* (2013.01); *G06N 20/00* (2019.01)

(58) Field of Classification Search
CPC ..... G06F 2212/6082; G06F 2212/1024; G06F 2212/452; G06F 1/329; G06F 11/3058; G06N 20/00
See application file for complete search history.

(56) References Cited

U.S. PATENT DOCUMENTS

| | | | |
|---|---|---|---|
| 6,643,739 | B2 | 11/2003 | Van De Waerdt et al. |
| 6,678,792 | B2 | 1/2004 | van de Waerdt |
| 6,898,671 | B2 | 5/2005 | Ito et al. |
| 7,856,548 | B1* | 12/2010 | Nelson .................. G06F 9/3832 712/225 |
| 7,979,640 | B2 | 7/2011 | Chaudhry et al. |
| 8,180,965 | B2 | 5/2012 | Lu |
| 8,392,651 | B2 | 3/2013 | Mylavarapu |
| 9,092,343 | B2 | 7/2015 | Yu et al. |
| 2006/0004957 | A1 | 1/2006 | Hand, III et al. |
| 2012/0131311 | A1* | 5/2012 | Chou .................. G06F 9/3806 712/207 |
| 2014/0201449 | A1 | 7/2014 | Sassone et al. |
| 2015/0067357 | A1 | 3/2015 | Arora et al. |
| 2015/0363318 | A1 | 12/2015 | Redford et al. |
| 2016/0335131 | A1 | 11/2016 | Goh et al. |
| 2017/0046158 | A1* | 2/2017 | Yen ..................... G06F 9/30043 |
| 2017/0286119 | A1* | 10/2017 | Al Sheikh ............. G06F 9/3806 |

FOREIGN PATENT DOCUMENTS

| | | |
|---|---|---|
| JP | 2014085890 | 5/2014 |
| JP | 2014186397 | 10/2014 |
| JP | 2016507097 | 3/2016 |
| TW | 200607351 | 2/2006 |
| TW | 201437828 | 10/2014 |

OTHER PUBLICATIONS

BobMcGee 'Re: What's the point of a hash table?'. In Stackoverflow [online], Feb. 1, 2010; 21:00:43 [retrieved on Aug. 5, 2020], Retrieved from the Internet: <URL: https://stackoverflow.com/questions/2179965/whats-the-point-of-a-hash-table>. (Year: 2010).*

Michael D. Powell et al.,"Reducing Set-Associative Cache Energy via Way-Prediction and Selective Direct-Mapping", Proceedings of the 34th ACM/IEEE International Symposium on Microarchitecture (MICRO), Dec. 1-5, 2001, pp. 54-65.

Mrinmoy Ghosh et al.,"Way Guard: A Segmented Counting Bloom Filter Approach to Reducing Energy for Set-Associative Caches",Proceedings of the 2009 International Symposium on Low Power Electronics and Design, Aug. 19-21, 2009 pp. 165-170.

"Office Action of Taiwan Counterpart Application", dated Sep. 25, 2018, p. 1-p. 6.

"Office Action of Japan Counterpart Application", dated May 15, 2018, p. 1-p. 5.

"Office Action of China Counterpart Application", dated Jan. 19, 2021, p. 1-p. 11.

* cited by examiner

PROCESSOR AND WAY PREDICTION METHOD THEREOF

BACKGROUND

Field of the Invention

The invention relates to a processor, and is further directed to a way prediction method thereof.

Description of Related Art

Recently, electronic apparatus with powerful processor is necessary for human's life. For improving efficiency of the processor, a cache memory is necessary for the processor. In a multi-way cache system, for accessing a large amount of data rapidly, the processor in conventional art consumes a large amount of power, and generates an undesirable amount of heat.

What is needed is a processor with a multi-way data cache system that offers the performance advantages of a large low-latency cache but consumes less power.

SUMMARY OF THE INVENTION

The invention is directed to a processor and way prediction method thereof for saving power consumption.

The present disclosure provides one processor including a prediction table, a prediction logic circuit, and a prediction verification circuit. The prediction table has a plurality of sets respectively corresponding to a plurality of cache sets of a cache memory in the cache system, and each of the sets has a plurality of confidence values respectively corresponding to a plurality of ways of each of the cache sets, wherein the prediction table receives an index, and provides the confidence values of a selected set according to the index. The prediction logic circuit is coupled to the prediction table, receives the confidence values of the selected set, and generates a prediction result by judging whether each of the confidence values of the selected set is larger than a threshold value or not. The prediction verification circuit is coupled to the cache memory, the prediction logic circuit and the prediction table, receives the prediction and real results, generates a correct/incorrect information according to the prediction and real results, and generates an update information according to the correct/incorrect information. Wherein, the prediction verification circuit updates the confidence values of the prediction table according to the update information.

The present disclosure provides another processor including a prediction table, a prediction logic circuit, and a prediction verification circuit. The prediction table has a plurality of sets respectively corresponding to a plurality of cache sets of a cache memory in the cache system, and each of the sets having a hot way number, at least one warm way number, and at least one confidence value corresponding to the at least one warm way number, wherein the prediction table receives an index, and provides the hot way number, the at least one warm way number and the at least one confidence value of the at least one warm way number according to the index. The prediction logic circuit is coupled to the prediction table, and generates a prediction result by predicting the hot way number as an opened way and by judging whether the at least one confidence value of the at least one warm way number is larger than a threshold value or not. If the at least one confidence value is larger than the threshold value, the warm way number is predicted to be an opened way as well. Otherwise, the warm way number is predicted to be a closed way. The prediction verification circuit is coupled to the cache memory, the prediction logic circuit and the prediction table, receives the prediction and real results, generates a correct/incorrect information according to the prediction and real results, and generates an update information according to the correct/incorrect information. Wherein, the prediction verification circuit updates the hot way number, the at least one warm way number and its at least one confidence value according to the update information.

The present disclosure provides one way prediction method adapted for a processor. The way prediction method includes: setting a prediction table, wherein the prediction table has a plurality of sets respectively corresponding to a plurality of cache sets of a cache memory in the cache system, and each of the sets has a plurality of confidence values respectively corresponding to a plurality of ways of each of the cache sets; receiving an index, and providing the confidence values of a selected set according to the index by the prediction table; receiving the confidence values of the selected set, and generating a prediction result by judging whether each of the confidence values of the selected set is larger than a threshold value or not; receiving the prediction result, generating a correct/incorrect information according to the prediction and real results, and generating an update information according to the correct/incorrect information; and updating the confidence values of the prediction table according to the update information.

The present disclosure provides another way prediction method adapted for a processor. The way prediction method includes: setting a prediction table, wherein the prediction table has a plurality of sets respectively corresponding to a plurality of cache sets of a cache memory in the cache system, and each of the sets has a hot way number, at least one warm way number, and at least one confidence value corresponding to the at least one warm way number; the way predcition method includes: receiving an index, and providing the hot way number, the at least one warm way number and its at least one confidence value according to the index by the prediction table; and the way prediction method includes: generating a prediction result by predicting the hot way number as an opened way and by judging whether the at least one confidence value of the at least one warm way number is larger than a threshold value or not. If the at least one confidence value is larger than the threshold value, the warm way number is predicted to be an opened way as well. Otherwise, the warm way number is predicted to be a closed way; receiving the prediction result, generating a correct/incorrect information according to the prediction and real results, and generating an update information according to the correct/incorrect information; and, updating the hot way number, the at least one warm way number and its at least one confidence value according to the update information.

According to the above descriptions, present disclosure provides a prediction table and determines which way being predicted as an opened way by comparing confidence value thereof with a threshold value. The prediction table is also updated according to the correct/incorrect information. With this invention, one or more ways can be predicted to be opened, and power consumption can be saved accordingly because all of the ways of a selected cache set are not opened all the time in order to get the correct data In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A illustrates a schematic diagram of the prediction table according to the embodiment of present disclosure.

FIG. 5B illustrates another schematic diagram of the prediction table according to the embodiment of present disclosure.

DETAILED DESCRIPTION OF DISCLOSED EMBODIMENTS

Figure 1:
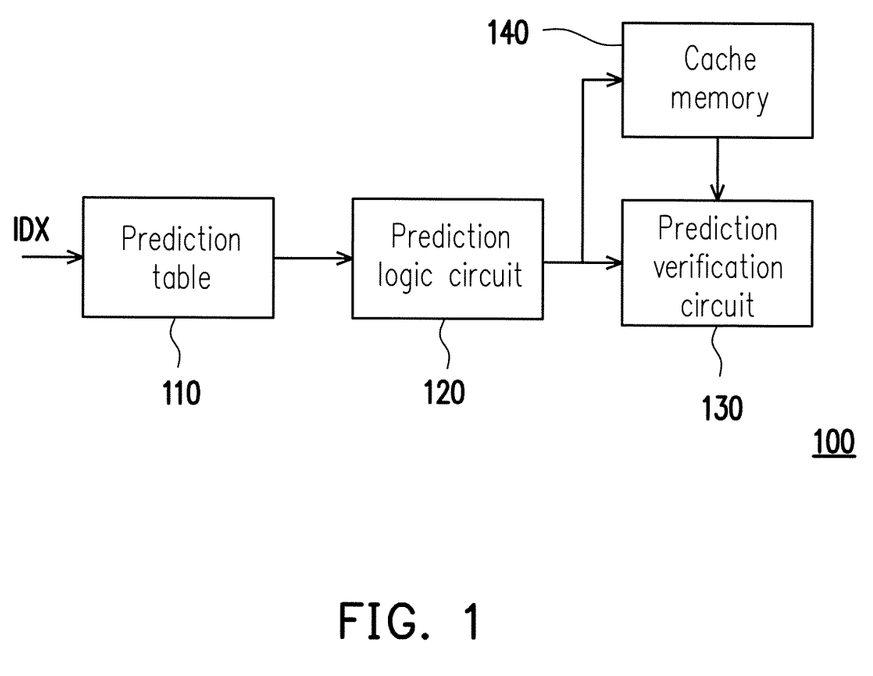
FIG. 1 illustrates a block diagram of a processor according to an embodiment of present disclosure.

Please refer to FIG. 1, FIG. 1 illustrates a block diagram of a processor according to an embodiment of present disclosure. The processor 100 includes a prediction table 110, a prediction logic circuit 120, and a prediction verification circuit 130. The prediction table 110 is coupled to the prediction logic circuit 120, the prediction logic circuit 120 is coupled to a cache memory 140 and the prediction verification circuit 130, and the prediction verification circuit 130 is coupled to the cache memory 140. Here, refer to FIG. 1 and FIG. 5A, wherein FIG. 5A illustrates a schematic diagram of the prediction table according to the embodiment of present disclosure. The prediction table 110A in FIG. 5A includes a plurality of sets SET1~SETN, and the sets SET1~SETN respectively correspond to a plurality of cache sets of the cache memory 140. Further, each of the sets SET1~SETN has a plurality of confidence values CV1-1~CVN-4, and the confidence values in each set respectively correspond to a plurality ways of each cache set. For example, the confidence values CV1-1~CV1-4 in set SET1 respectively correspond to four ways of first cache set, and the confidence values CVN-1~CVN-4 in set SETN respectively correspond to four ways of Nth cache set.

In operation, the prediction table 110A may receive an index IDX, selects one of the sets SET1~SETN, and provides the confidence values of a selected set to the prediction logic circuit 120. For example, if the set SET1 is selected according to the index IDX, the prediction table 110A may provide the confidence values CV1-1~CV1-4 to the prediction logic circuit 120.

The prediction logic circuit 120 receives the confidence values CV1-1~CV1-4, and generates a prediction result by judging whether each of the confidence values CV1-1~CV1-4 of the selected set is larger than a threshold value or not. If the confidence value CV1-1 is larger than the threshold and the confidence values CV1-2~CV1-4 are not larger than the threshold, the way of the cache memory 140 corresponding to the confidence value CV1-1 can be determined to be an opened way, and the ways of the cache memory 140 corresponding to the confidence value CV1-2~CV1-4 can be determined to be closed ways. If the confidence value CV1-1~CV1-2 are larger than the threshold and the confidence values CV1-3~CV1-4 are not larger than the threshold, the ways of the cache memory 140 corresponding to the confidence value CV1-1~CV1-2 can be determined to be opened ways, and the ways of the cache memory 140 corresponding to the confidence value CV1-3~CV1-4 can be determined to be closed ways.

The prediction verification circuit 130 and the cache memory 140 receives the prediction result from the prediction logic circuit 120, and the cache memory 140 accesses the opened way(s) of a selected cache set according to the prediction result. After the cache memory 140 has accessed the selected cache set and determined the cache hit/miss/allocation condition, the cache memory 140 sends the tags of the opened ways and the cache way hit/miss/allocation information to the prediction verification circuit 130. Furthermore, the predication verification circuit 130 compares the tags of one or more opened way(s) with an expected tag and combines the cache way hit/miss/allocation information to generate a prediction correct/incorrect information. In detail, if the tag of an opened way equals to the expected tag, prediction of the opened way can be determined to be correct. On the contrary, if the tag of an opened way is different from the expected tag, prediction of the opened way can be determined to be incorrect. The prediction correct/incorrect information also includes the hit way number if the cache is hit or the allocated/refilled way number if the cache is missed. The hit way number or the allocated/refilled way number can be treated as a correct way number.

For the cache memory 140 to determine the cache hit/miss/allocation condition, the following steps are performed. If the cache is hit on one of the opened ways, the data obtained from the opened way is transferred to the processor 100 directly. It can be determined that the cache is hit and the hit way is an opened way. On the other hand, if the cache is missed on all of the opened ways, the remaining way(s) that is not opened in the previous access is then accessed to determine whether a tag of one of the remaining ways equals to the expected tag. If the cache is hit on one of the remaining ways, the data obtained from this way is transferred to the processor 100. It can be determined that the cache is hit and the hit way is a closed way. Otherwise, it can be determined that the data is not in the cache (i.e., the cache is missed) and a way has to be allocated to store the missed data. Once the missed data is retrieved from outside memory, the data is transferred to the processor 100 and, at the same time, stored in the allocated way in the cache.

The prediction verification circuit 130 further generates an update information according to the correct/incorrect information, and the update information can be used to update the confidence values in the prediction table 110A. In detail, according to the correct/incorrect information, the prediction verification circuit 130 can set confidence value of a correct way to a relative high value (a pre-set value), and decrease confidence values of incorrect ways by a step value, the pre-set value is larger than the step value. For example, by referring to FIG. 5A, if the way corresponding to the confidence value CV1-1 is determined to be the correct way, the confidence value CV1-1 is set to the pre-set value. Then, the ways corresponding to the confidence value CV1-2~CV1-4 can be determined to be incorrect ways, and the confidence value CV1-2~CV1-4 are decreased by the step value. Of course, if each of the confidence values CV1-2~CV1-4 is decreased to equal to a minimum value, each of the confidence values CV1-2~CV1-4 can be held on the minimum value.

For reducing the size of the prediction table, please refer to FIG. 5B. FIG. 5B illustrates another schematic diagram of the prediction table according to the embodiment of present disclosure. In FIG. 5B, the prediction table 110B has a plurality of sets SET1~SETN respectively corresponding to a plurality of cache sets of a cache memory 140. The sets SET1~SETN respectively have hot way numbers HID1~HIDN, warm way numbers WID1~WIDN and confidence values CV1~CVN. Wherein, the confidence values CV1~CVN respectively correspond to the warm way numbers WID1~WIDN. The prediction table 110B in FIG. 5B also receives the index IDX, and provides hot way number, warm way number and its corresponding confidence value according to the index IDX. For example, if the set SET2 is selected by the index IDX, the prediction table 110B provides the hot way number HID2, the warm way number WID2 and its corresponding confidence value CV2. By only recording the hot way number, the warm way number and its corresponding confidence value, the size of the prediction table 110B can be reduced for saving hardware cost.

Please be noted here, the embodiment in FIG. 5B provides a scheme for compressing the prediction table 110A in horizontal direction. In another embodiment, the prediction table 110A and 110B may be further compressed in vertical direction. For example, in the prediction table 110B, number of sets SET1-SETN may be smaller than set number of the cache memory 140. In this case, two or more sets of the cache memory 140 can be referred to one set of the prediction table 110B, and one of the sets SET1-SETN of the prediction table 110B may be shared.

In some embodiment, each of the sets in the prediction table 110B may have two or more warm way numbers.

In detailed operations, entries of the prediction table 110B can be updated according to the correct/incorrect information. The prediction verification circuit 130 can generate update information according to the correct/incorrect information. The update information may include the way number of the last cache hit or refill operation, and if the way number of the last cache hit or refill operation equals to the hot way number, the prediction verification circuit 130 keeps the hot way number unchanged, and decreases the confidence value corresponding to the warm number by a step value (ex. 1). If the way number of the last cache hit or refill operation equals to the warm way number, the prediction verification circuit 130 exchanges the warm way number and the hot way number, and sets the confidence value of the warm way to a pre-set value.

In this embodiment, the way number is an identification (ID) number of the way.

For example, the set SET1 is the selected set, and originally, the hot way number HID1 is 2, and the warm way number WID1 is 5. If the warm way number WID1 is determined to be the correct way of the last cache hit or refill operation, the hot way number HID1 is changed to 5, and the warm way number WID1 is changed to 2, and the confidence value CV1 of the warm way may be set to 3 correspondingly.

Figure 2A:
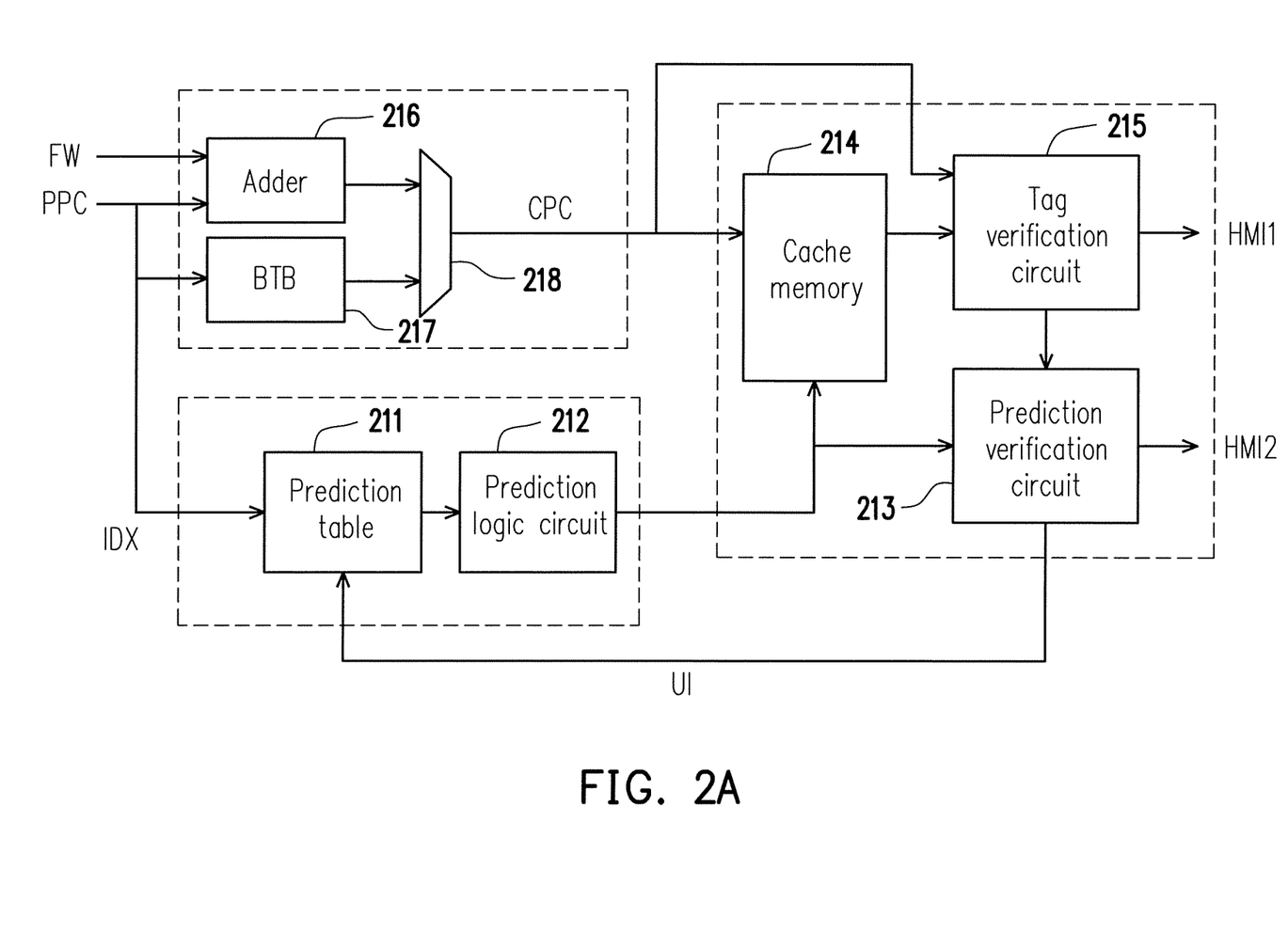
FIG. 2A and FIG. 2B respectively illustrate different cache systems according to an embodiment of present disclosure.
Figure 2B:
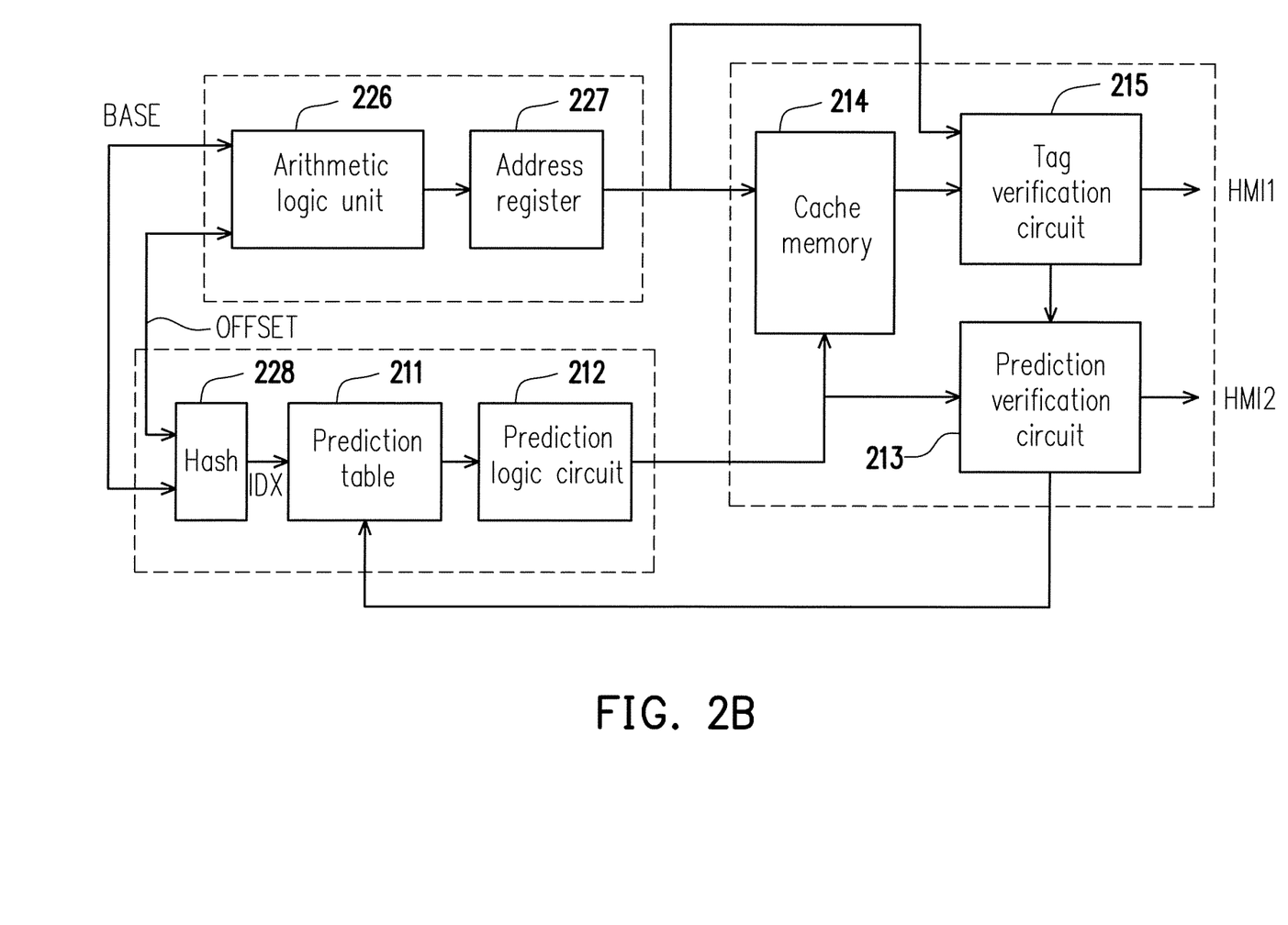

Please refer to FIG. 2A and FIG. 2B. FIG. 2A and FIG. 2B illustrate different cache systems respectively according to an embodiment of present disclosure. In FIG. 2A, an instruction cache system is illustrated. An adder 216 receives a fetch width FW, and a branch-target buffer (BTB) 217 receives a previous program counter, and a selector 218 receives outputs of the adder 216 and the BTB 217. The selector 218 generates a current program counter CPC and transports the current program counter CPC to the cache memory 214. On the other hand, a prediction table 211 receives the previous program counter PPC to be an index IDX. The prediction table 211 transports confidence values to the prediction logic circuit 212. The prediction logic circuit 212 generates a prediction result by judging whether each of the confidence values of the selected set is larger than a threshold value or not. The prediction verification circuit 213 receives the prediction result, and generates a correct/incorrect information HMI2 for prediction scheme by receiving cache way hit/miss information from a tag verification circuit 215 and comparing tags of predicted ways and an expected tag according to the prediction result, and generating an update information UI according to the prediction correct/incorrect information HMI2.

A tag verification circuit 215 is coupled to the cache memory 214, and compares tags from the cache memory 214 and an expected tag for generating a hit/miss information HMI1 of the cache system for data accessing.

In FIG. 2B, a data cache system is illustrated. Different from FIG. 2A, a hash operator 228 receives a base part address BASE and an offset part address OFFSET, and operates a hash operation on the base part address BASE and the offset part address OFFSET to generate the index IDX. The base part address BASE and the offset part address OFFSET are also fed to an arithmetic logic unit 226 for operation, and the operation result is stored in an address register 227. That is, the prediction table 211 may provide information to the prediction logic circuit 212 according to different index IDX in an instruction cache system and a data cache system.

Figure 3:
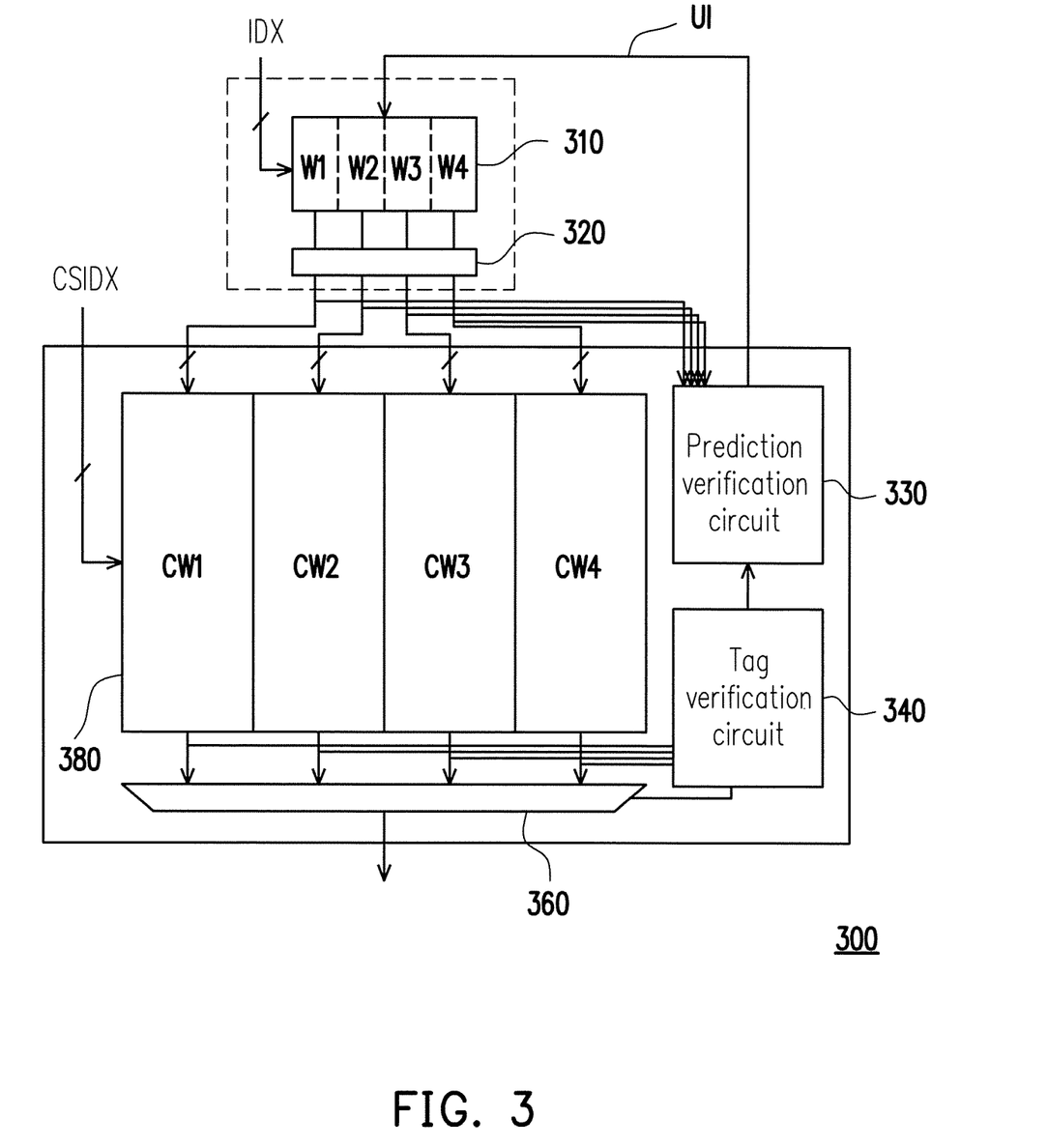
FIG. 3 illustrates a block diagram of a processor according to an embodiment of present disclosure.

Please refer to FIG. 3, FIG. 3 illustrates a block diagram of a processor according to an embodiment of present disclosure. The processor 300 includes a prediction table 310, a prediction logic circuit 320 and a prediction verification circuit 330. The prediction table 310 includes a plurality of sets and one of the sets is selected according to an index IDX. There are 4 ways W1~W4 in the selected set of the prediction table 310, and the ways W1~W4 are corresponding to the ways CW1~CW4 of a selected set of cache memory 380 respectively. The selected set of cache memory 380 is selected according to a cache set index CSIDX.

In detailed operation, the prediction table 310 provides confidence values of the ways W1~W4 of the selected set to the prediction logic circuit 320. The prediction logic circuit 320 determines a prediction result by judging whether each of the confidence values of the selected set is larger than a threshold value or not. For example, if all of the confidence values of the ways W1~W4 are larger than the threshold value, all the ways CW1~CW4 are predicted to be opened ways. Or if only the confidence value of the way W1 is larger than the threshold value, only the way CW1 is predicted to be an opened way.

The prediction verification circuit 330 compares tag of the at least one opened way of the cache memory 380 with an expected tag to generate the correct/incorrect information. If one of the predicted opened way is determined to be correct, the prediction verification circuit 330 sets the corresponding confidence value to a pre-set value, and the prediction verification circuit 330 also decreases the confidence values corresponding to the incorrect ways by a step value (ex. 1). Based on these steps, update information UI can be generated by the prediction verification circuit 330, and the update information UI is provided to the prediction table 310 for updating the prediction table 310 accordingly.

The tag verification circuit 340 is coupled to the cache memory 380 and the prediction verification circuit 330. The tag verification circuit 340 can be used to determine if any tag of the ways in the cache memory 380 is the same as the expected tag. And if the expected tag matches the tag of a way, the expected data from the cache memory 380 can be sent to the core circuit of the processor 300 through an interface circuit 360.

Figure 4:
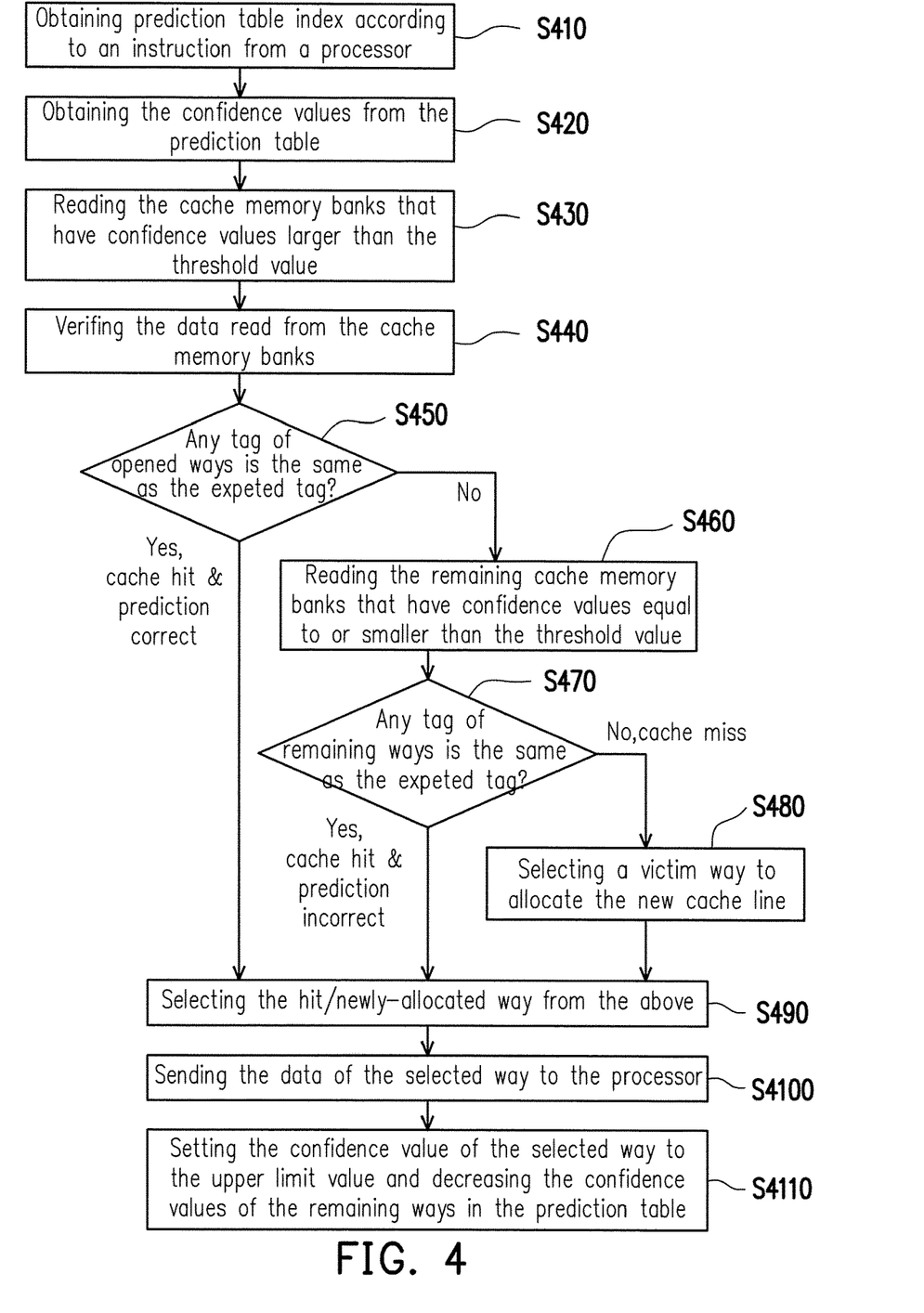
FIG. 4 illustrates a flow chart of a way prediction method according to an embodiment of present disclosure.

Please refer to FIG. 4, FIG. 4 illustrate a flow chart of a way prediction method according to an embodiment of present disclosure. In step S410, an index for a prediction table is obtained according to an instruction from a processor. In step S420, the confidence values from the prediction table are obtained according to the index. In step S430, the cache ways which have confidence values larger than the threshold value are read; and the data read from the cache ways are verified in step S440. Furthermore, in step S450, it is determined whether any tag of the opened ways is the same as the expected tag, and if one tag of the opened ways is the same as the expected tag, a "cache hit" and "prediction correct" condition can be determined, and step S490 is then executed. If all tags of the opened ways are not the same as the expected tag, step S460 is executed.

In step S460, the remaining cache ways which have confidence values not larger than the threshold value are read. And then step S470 determines whether any tag of the remaining ways is the same as the expected tag. If one tag of the remaining ways is the same as the expected tag, a "cache hit" and "prediction incorrect" condition is determined, and step S490 is then executed. If all of the tags are different from the expected tag, a cache miss condition is determined and step S480 is executed.

In step S480, a cache way (victim way) is selected to be the cache refill location for the missed cache line and the missed cache line is allocated. In step S490, the hit way from step S450 or the newly selected way for cache refill operation from step S490 is selected. And the missed cache line data allocated to the selected way is sent to the processor in step S4100. In step S4110, the confidence values are adjusted by setting the confidence value of the selected way to the upper limit value (the pre-set value) and by decreasing the confidence values of the remaining ways.

Figure 6A:
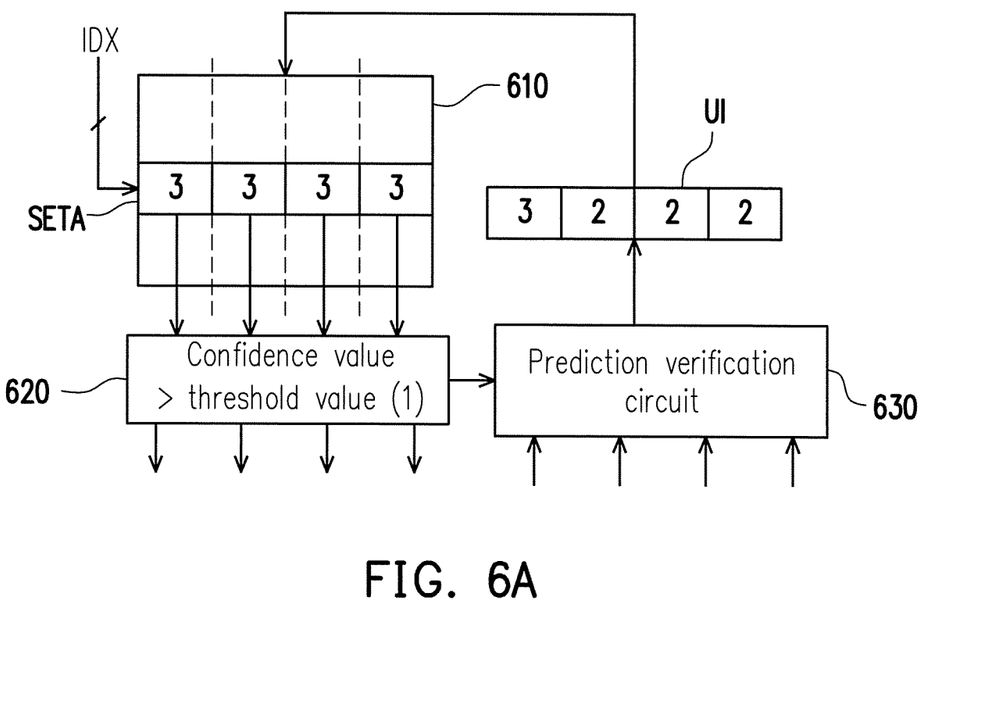
FIG. 6A-FIG. 6E illustrate a schematic diagram for updating the prediction table according to an embodiment of present disclosure.

Please refer to FIG. 6A-FIG. 6E, FIG. 6A-FIG. 6E illustrate a schematic diagram for updating the prediction table according to an embodiment of present disclosure. In FIG. 6A to FIG. 6E, the prediction table is the same as the prediction table 110A in FIG. 5A. In FIG. 6A, a set SETA of the prediction table 610 is selected according to the index IDX. The confidence values 3, 3, 3, 3 are sent to the prediction logic circuit 620 for determining whether each of the confidence values are larger than the threshold (1) value. In FIG. 6A, all of the confidence values are larger than the threshold value, and all the ways are predicted to be opened ways. The prediction verification circuit 630 compares tags between the predicted opened ways and an expected tag, and in this example the first way is determined to be the correct way. Accordingly, the prediction verification circuit 630 transports the updated information UI with 3, 2, 2, 2 to the prediction table 610 for updating the confidence values in the set SETA of the prediction table 610.

Figure 6B:
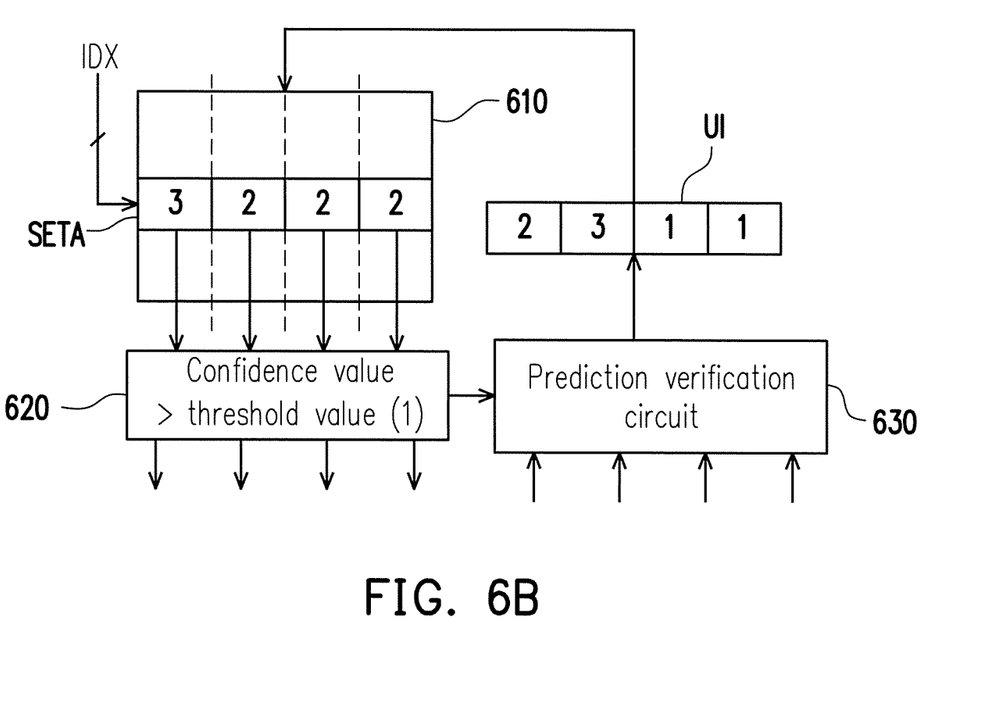

In FIG. 6B, the way prediction scheme is operated again, and the prediction verification circuit 630 determines the second way is the correct way. The prediction verification circuit 630 generates the updated information UI with 2, 3, 1, 1 for updating the confidence values in the set SETA of the prediction table 610.

Figure 6C:
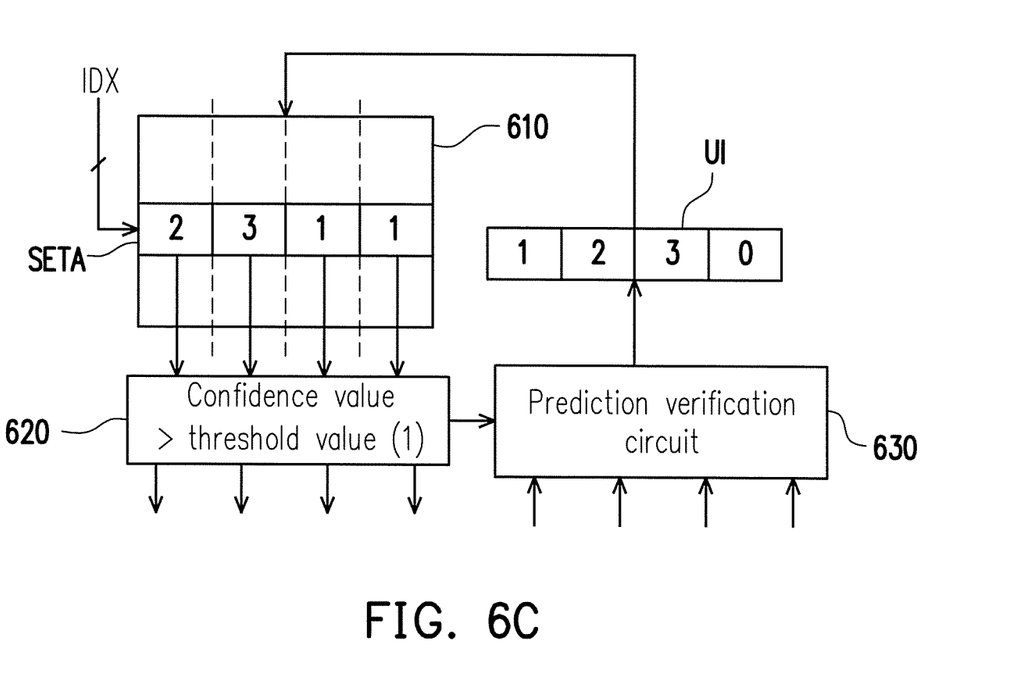
Figure 6D:
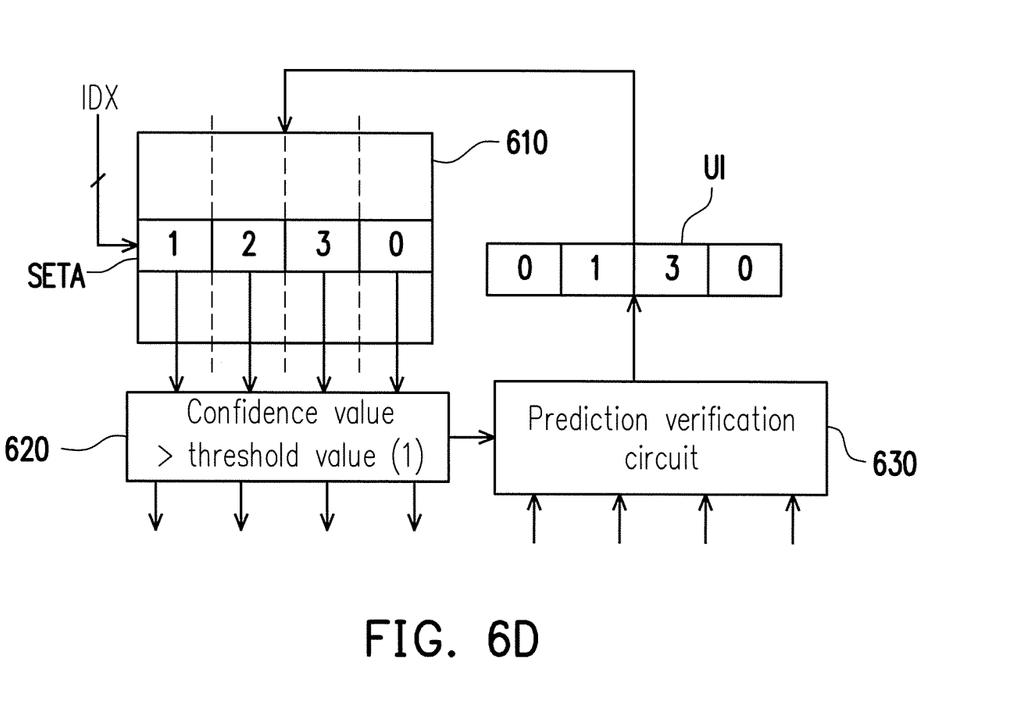
Figure 6E:
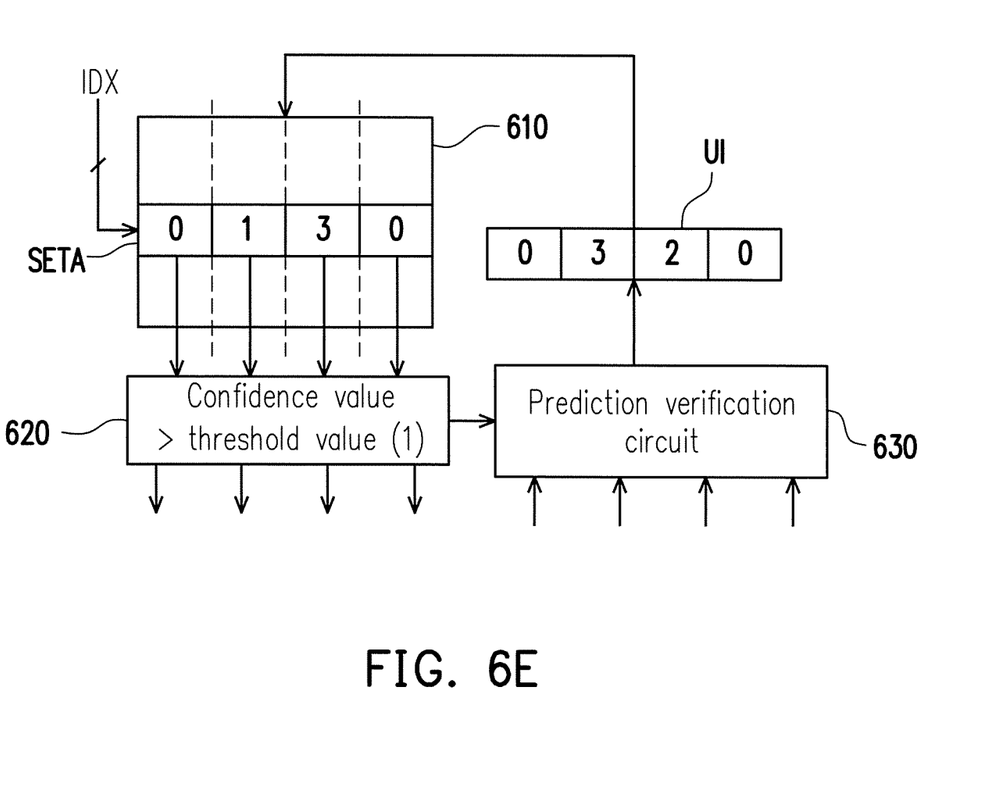

In FIG. 6C, since the confidence values of the third and fourth ways are not larger than the threshold value (1), only the first and second ways are predicted to be opened ways. Then, the prediction verification circuit 630 verifies that the third way is the correct way, and generates a new update information 1, 2, 3, 0 for updating the confidence values in the set SETA of the prediction table 610. In this case, the confidence value of the third way is set to the pre-set value (upper limit value) of 3. In FIG. 6D, the third way is again the correct way, and the confidence value of the third way is held on 3, and the confidence values of the remaining ways are decreased by 1. In FIG. 6E, the second way is determined to be a new correct way, the confidence value of the second way is then set to the pre-set value (upper limit value) of 3, and the confidence values of the remaining ways are decreased by 1.

Please refer to FIG. 7A-FIG. 7E, FIG. 7A-FIG. 7E illustrate a schematic diagram for updating the prediction table according to another embodiment of present disclosure. In FIG. 7A to FIG. 7E, the prediction table 710 is the same as the prediction table 110B in FIG. 5B. The set SETA is selected according to the index IDX, the prediction logic circuit 720 is used to compare between the confidence values and the threshold value to generate the prediction information. The prediction verification circuit 730 determines the correct/incorrect information and generates an updated information UI.

Figure 7A:
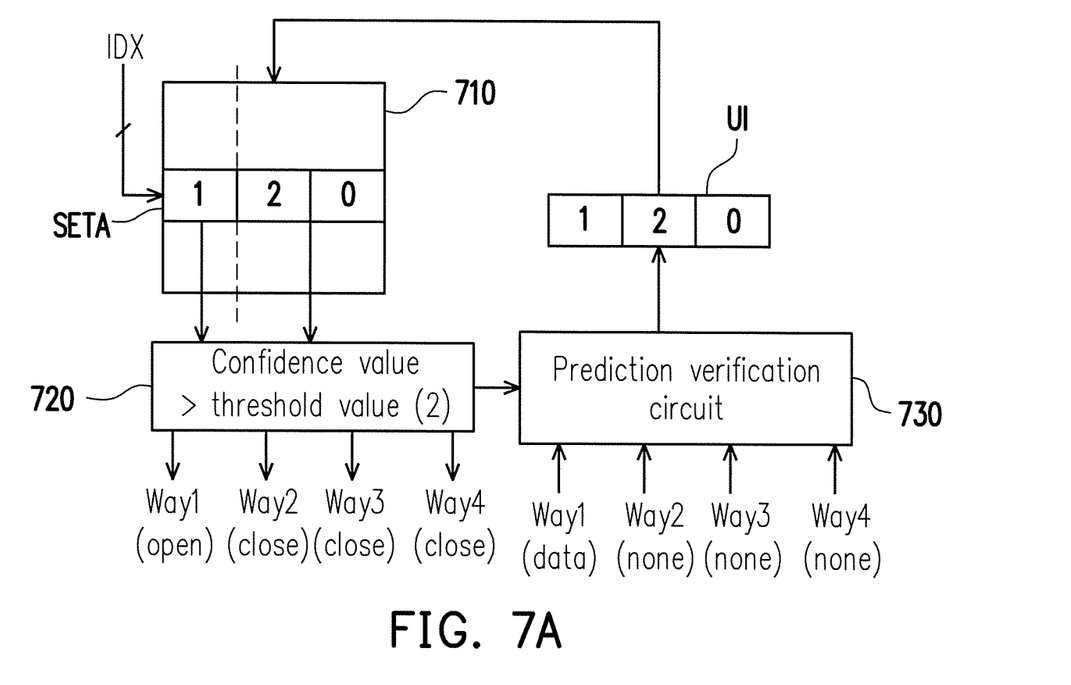
FIG. 7A-FIG. 7E illustrate a schematic diagram for updating the prediction table according to another embodiment of present disclosure.

In FIG. 7A, the set SETA of the prediction table 710 records 1, 2, 0 to indicate that the first way is a hot way and the second way is a warm way. The confidence value (0) of the second way is not larger than the threshold value (2). Therefore, the first way is predicted to be opened and the remaining cache ways are predicted to be closed. Then, the prediction verification circuit 730 indicates that the first way is the correct way. Accordingly, the prediction verification circuit 730 keeps the first way as the hot way and tries to decrease the confidence value of the second way, or keep the confidence value at the minimum value if it is already the minimum value. So, when the confidence value is kept at the minimum value, the confidence value is not changed. The updated information UI with 1, 2, 0 is then sent to the prediction table 710.

Figure 7B:
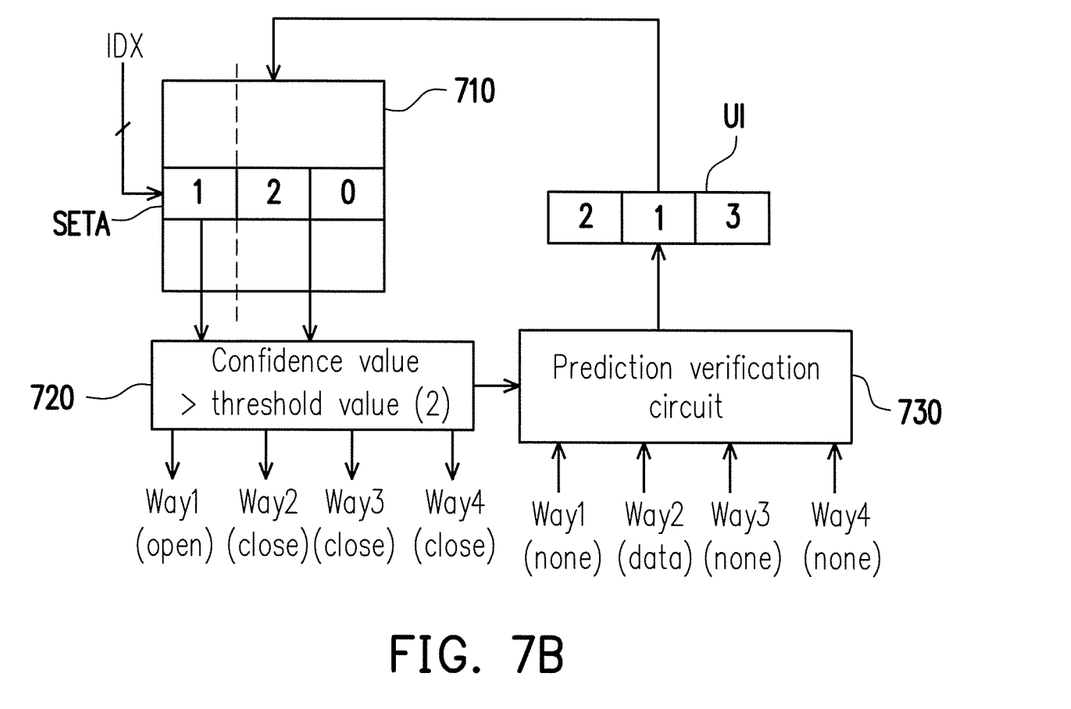

In FIG. 7B, the prediction table 710 indicates that the first way is a hot way and the second way is a warm way. The confidence value (0) of the second way is still less than the threshold value (2). Therefore, the first way is predicted to be opened and the remaining cache ways are predicted to be closed. However, the prediction verification circuit indicates that the second way is the correct way this time. Therefore, the prediction verification circuit 730 upgrades the second way to the hot way, downgrades the first way from the hot way to the warm way and sets the confidence value of the first way to the pre-set value (3). The updated information UI with 2, 1, 3 is then sent to the prediction table 710.

Figure 7C:
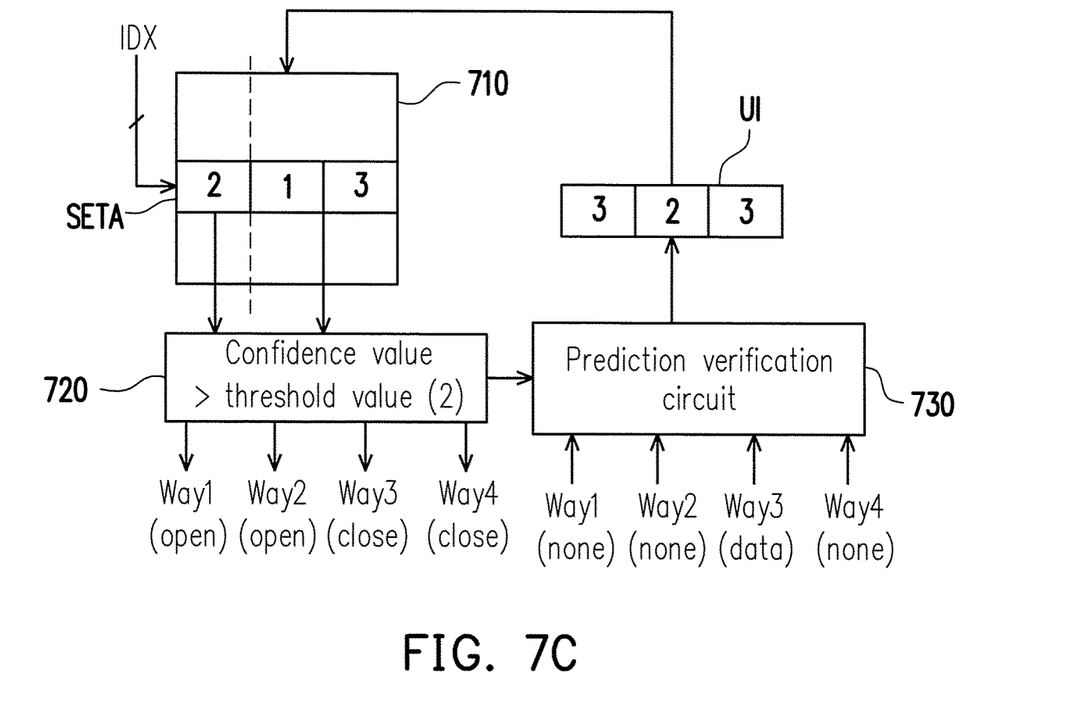

In FIG. 7C, the prediction table 710 indicates that the second way is a hot way and the first way is a warm way which has a confidence value (3) larger than the threshold value (2). Therefore, the first way and the second way are predicted to be opened, and the third way and the forth way are predicted to be closed. Then, the prediction verification circuit 730 indicates that the third way is the correct way. Accordingly, the prediction verification circuit 730 upgrades the third way to the hot way, downgrades the second way from the hot way to the warm way and set the confidence value of the second way to the pre-set value (3). The updated information UI with 3, 2, 3 is then sent to the prediction table 710.

Figure 7D:
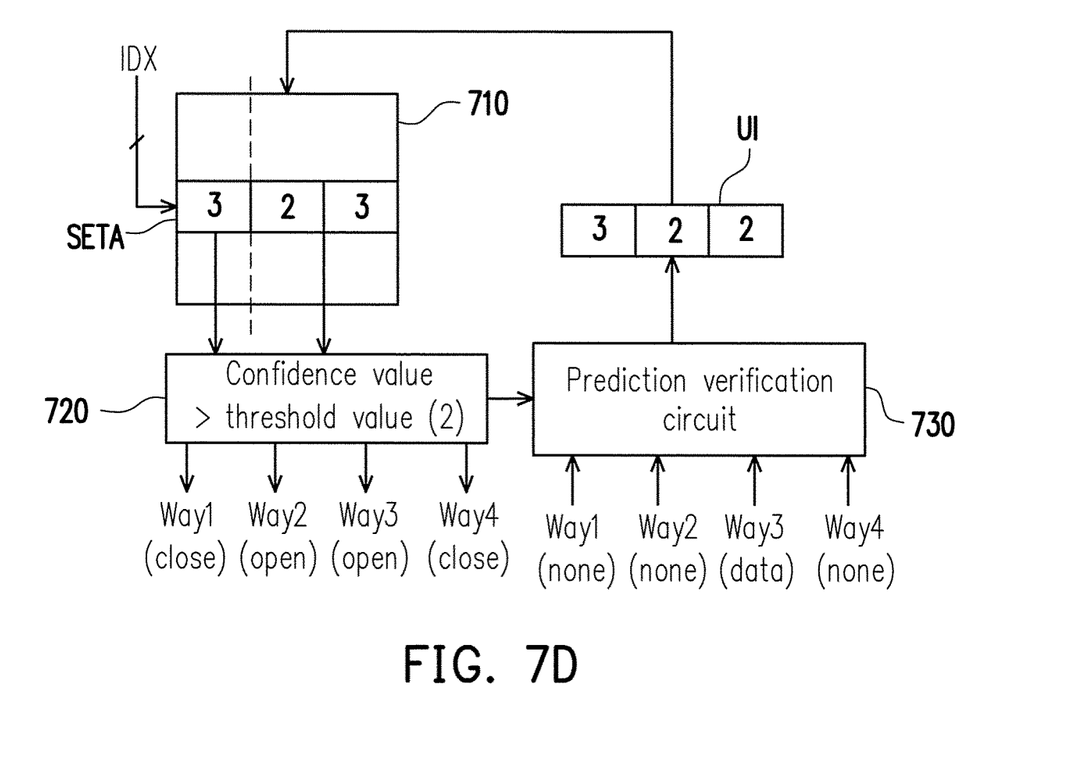

In FIG. 7D, the prediction table 710 indicates that the third way is a hot way and the second way is a warm way which has a confidence value (3) larger than the threshold value (2). Therefore, the third way and the second way are predicted to be opened, and the remaining ways are predicted to be closed. Then, the prediction verification circuit 730 indicates that the third way is the correct way. Accordingly, the prediction verification circuit 730 keeps the third way as the hot way, and decreases the confidence value of the second way from 3 to 2. The updated information UI with 3, 2, 2 is then sent to the prediction table 710.

Figure 7E:
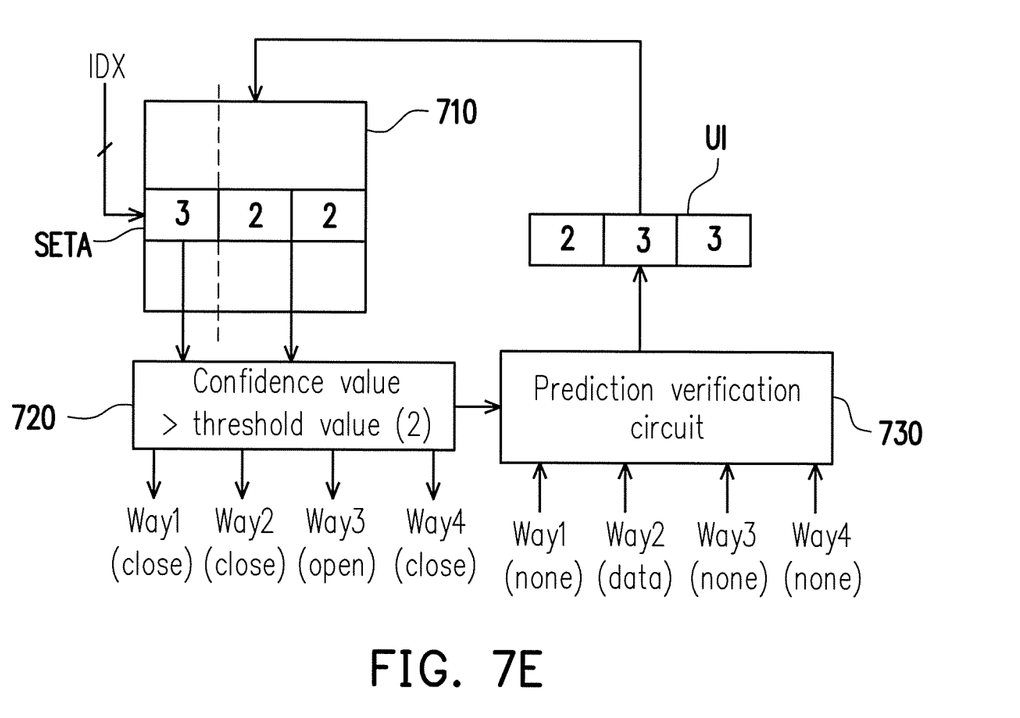

In FIG. 7E, the prediction table 710 indicates that the third way is still a hot way and the second way is a warm way which has a confidence value (2) not larger than the threshold value (2). Therefore, the third way is predicted to be opened and the remaining ways are predicted to be closed. Then, the prediction verification circuit 730 indicates that the second way is the correct way. Accordingly, the prediction verification circuit 730 upgrades the second way to the hot way, downgrades the third way to the warm way and set the confidence value of the third way to the pre-set value (3). The updated information UI with 2, 3, 3 is then sent to the prediction table 710.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A processor, comprising:
a prediction table, having a plurality of sets respectively corresponding to a plurality of cache sets of a cache memory, and each of the sets having a plurality of confidence values, wherein the prediction table receives an index corresponding to a selected cache set of the cache memory, and provides the confidence values of a selected set according to the index;
a prediction logic circuit, coupled to the prediction table, receiving the confidence values of the selected set, and generating a prediction result by judging whether each of the confidence values of the selected set is larger than a threshold value or not to predict whether the corresponding way is to be opened or not for way prediction; and
a prediction verification circuit, coupled to the cache memory, the prediction logic circuit and the prediction table, receiving the prediction result, generating a correct/incorrect infoi nation according to the prediction result, and generating an update information according to the correct/incorrect information,
wherein, the prediction verification circuit updates the confidence values of the prediction table according to the update information.

2. The processor as claimed in claim 1, wherein the prediction logic circuit predicts at least one of the ways of the selected cache set to be at least one opened way according to the confidence values of the selected set, and the prediction verification circuit compares a tag of the at least one opened way with an expected tag to generate the correct/incorrect information.

3. The processor as claimed in claim 2, wherein the prediction verification circuit sets the confidence value of a correct way to a pre-set value and decrease the confidence values of a plurality of incorrect ways by a step value.

4. The processor as claimed in claim 3, wherein the pre-set value is larger than the step value.

5. The processor as claimed in claim 3, wherein the threshold value is smaller than the pre-set value.

6. The processor as claimed in claim 3, wherein if the confidence value of an incorrect way is at a minimum value, the confidence value of the incorrect way is not decreased.

7. The processor as claimed in claim 1, wherein the index is generated according to a program counter of the processor or an address of accessed data.

8. The processor as claimed in claim 7, wherein if the index is generated according to the address of the accessed data, the index is generated by a hash operation on a base part of the address and an offset part of the address.

9. A way prediction method, adapted for a processor, comprising:
setting a prediction table, wherein the prediction table has a plurality of sets respectively corresponding to a plurality of cache sets of a cache memory in a cache system, and each of the sets has a plurality of confidence values;
receiving an index corresponding to a selected cache set of the cache memory, and providing the confidence values of a selected set according to the index by the prediction table;
receiving the confidence values of the selected set, and generating a prediction result by judging whether each of the confidence values of the selected set is larger than a threshold value or not to predict whether the corresponding way is to be opened or not for way prediction;
receiving the prediction result, generating a correct/incorrect information according to the prediction result, and generating an update information according to the correct/incorrect information; and
updating the confidence values of the prediction table according to the update information.

* * * * *